United States Patent
Guthrie et al.

(10) Patent No.: US 12,267,204 B2
(45) Date of Patent: Apr. 1, 2025

(54) SYSTEM AND METHOD TO USE POLLING TO SIMULATE SERVER EVENTS

(71) Applicant: MICRO FOCUS LLC, Santa Clara, CA (US)

(72) Inventors: Nurit Guthrie, Yehud (IL); Itzik Kabessa, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 18/228,494

(22) Filed: Jul. 31, 2023

(65) Prior Publication Data

US 2025/0047554 A1 Feb. 6, 2025

(51) Int. Cl.
*H04L 41/069* (2022.01)
*H04L 43/10* (2022.01)
*H04L 67/568* (2022.01)

(52) U.S. Cl.
CPC ............ *H04L 41/069* (2013.01); *H04L 43/10* (2013.01); *H04L 67/568* (2022.05)

(58) Field of Classification Search
CPC ...... H04L 41/069; H04L 43/10; H04L 67/568
See application file for complete search history.

(56) References Cited

U.S. PATENT DOCUMENTS

| | | | | |
|---|---|---|---|---|
| 2009/0228525 A1* | 9/2009 | Fridrich | .................. | G06Q 10/10 |
| 2010/0205243 A1* | 8/2010 | Brady | .................. | H04L 9/3297 |
| | | | | 709/229 |
| 2016/0366236 A1* | 12/2016 | Herman | ................. | H04L 65/612 |
| 2020/0356539 A1* | 11/2020 | Gradin | .................... | G06F 16/21 |
| 2021/0117443 A1* | 4/2021 | Zheng | .................. | G06F 16/273 |

OTHER PUBLICATIONS

Author: Forstner Title: How to Use Redis as an Event Store for Communication Between Microservices URL: https://redis.io/blog/use-redis-event-store-communication-microservices/ (Year: 2019).*

* cited by examiner

*Primary Examiner* — Kamal M Hossain
(74) *Attorney, Agent, or Firm* — Sheridan Ross P.C.

(57) ABSTRACT

A device, system, and method are provided. In one example, a method for polling for server events is described that includes storing, on a server, a list of events. The method also includes polling, by a client, the server for the list of events. The method includes receiving the list of events stored on the server. The method further includes broadcasting each event in the list of events received to an associated component; and requesting, by each component that receives at least one associated event, component related event data for each associated event.

20 Claims, 6 Drawing Sheets setEvent(tenantId, projectId, event)

Examples:
setEvent(888,1,'notifications')
888:1:notifications : time-stamp
setEvent(888,1,'notifications-oc')
888:0:notifications-oc : time-stamp getEvent(tenantId, projectId)

Examples:
getEvent(888,1) will get keys:
[888:0:notifications-oc, 888:1:notifications]
getEvent(888,2) will get keys:
[888:0:notifications-oc]

Non-Bolded = Project level event
Bolded = Tenant level event

SYSTEM AND METHOD TO USE POLLING TO SIMULATE SERVER EVENTS

FIELD

The disclosure relates generally to polling for server events and particularly to reducing the number of calls associated with polling for the server events.

BACKGROUND

A REST (representational state transfer) API (also known as RESTful API) is an application programming interface (API or web API) that conforms to the constraints of REST architectural style and allows for interaction with RESTful web services. REST requires that a client make a request to the server in order to retrieve or modify data on the server. API polling is the process of repeatedly sending requests to the same endpoint and comparing subsequent responses you receive to determine if there is updated information. As the number of features (e.g., User Interface (UI) components) running on a client increases, the number of polls requests also increase.

SUMMARY

These and other needs are addressed by the various embodiments and configurations of the present disclosure. Currently whenever a UI component in a client needs to know about an event that occurred in a server, the client polls the server for the data of interest. The present disclosure reduces the number of calls (e.g., polling) from clients by replacing all existing (and future) polling with a single poll request for events in the server. Whenever an event in the server happens, a record of the event is kept in the server (e.g., stored in cache) and the client polls only for the events stored on the server. When a UI component recognizes a new event that has occurred that is related to the UI component, it will poll the server for the relevant data. This reduces the number of client poll requests to a single one, allowing more and more UI components to be aware of server events without additional costs.

UI components may not be reactive, and data may change. For example, test-runs may change their status, a change may be made in a browser tab, operators may enable/disable certain features—and if the client is not aware of a change, it may be presenting stale information, which might even cause errors in some cases (e.g., editing a deleted entity). The only way for a client to react to occurrences in the server is to poll for server events. For example, the system polls for new notifications, for running tests, for report-templates and agent's statuses. Each poll request means more traffic to the server and more requests from the Database (DB). In addition to increased traffic, there is associated costs with increased polling. This is why a client is not designed to be reactive, unless absolutely necessary, however, this results in a stale UI.

Server Sent Events (SSE) is a server push technology enabling a client to receive automatic updates from a server via an HTTP connection, and describes how servers can initiate data transmission towards clients once an initial client connection has been established. SSE behaves unpredictably in edge cases, and is only applicable to cases that only require one-way communication (from server to client). WebSocket is a real-time technology that enables bidirectional, full-duplex communication between client and server over a persistent, single-socket connection. However, it is simpler and more secure to only use HTTP as the communication protocol between clients and servers. A third option is using a third-party service (e.g., AWS). In contrast, the one-poll solution of the present disclosure is easy to implement and control, with no additional cost and decreases the number of polling a client currently performs.

From the server side, there is a service that keeps a record of events in memory (e.g., the Redis cache). In embodiments, each record consists of an event name and a timestamp. For example, if the status of a run changes, the event 'runs' will be posted to record of events. In embodiments, this service can get events from other parts of our applications (e.g., Operations Console via RabbitMQ). Since the present disclosure stores the record of events in the cache, no calls to a database are made, which is a great improvement compared with the current solution and is more scalable.

From the client side, there is a service which polls for events. When the service identifies that a new event occurred, the service will broadcast any events to the relevant components (e.g., the components that subscribed for that event), and the component will ask the server for the specific data related to the component. This way, the client asks for data only when needed.

If one of the server instances gets an error while trying to save an event to the cache, it will broadcast a message to all server instances (e.g., via RabbitMQ), and all instances of the server will return an error for each polling request for a certain amount of time (e.g., 1.5*polling-interval). If the client receives an error in response to a poll request, the client will broadcast to all subscribed components, and each component requests the server for the required data. In other words, in the event an error occurs saving an event to the records, the system reverts to regular polling for a period of time, until the system recovers from the error. This way no data is missed, even if there is something wrong with the caching in the server.

Another issue is when an application/client is asleep for a duration that exceeds the duration the record is stored in the cache (e.g., sleep-duration error). For example, when an application is not visible for more than two minutes, the client stops polling, and so it might miss events. To overcome this, the client sends the server its sleep duration upon waking up in the event-poll request. If the sleep duration exceeds the retention policy of the event records in the cache, the server will return an error, and the client will prompt the relevant UI component to request data (e.g., regular polling).

Embodiments of the present disclosure aim to solve the above-noted shortcomings and other issues by reducing the number of existing polling from a client, which reduces client-server traffic, database access, and load on the server. Additionally, the present disclosure makes it easy to add more and more events (e.g., more UI components) with no additional cost, which will make the client much more reactive in exiting features, as well as future development of new features. As will be described in further detail herein a polling service replaces multiple poll requests with a single poll request to reduce traffic between a server and client, and ensure non-reactive UIs do not become stale UIs.

In an illustrative example, a method of polling for server events is disclosed that includes storing, on a server, a list of events; polling, by a client, the server for the list of events; receiving, at the client, the list of events stored on the server; broadcasting, by the client, each event in the list of events received to an associated component; and requesting, by each component that receives at least one associated event, component related event data for each associated event.

In another example, a system is disclosed that includes a processor; and a memory coupled with and readable by the processor and storing therein a set of instructions which, when executed by the processor, cause the processor to poll for server events by: transferring a poll request for a list of events associated with a project identifier and a tenant identifier, wherein the list of events is stored on a server; receiving the list of events from the server, wherein the list of events comprises at least one event associated with at least one component; broadcasting each event in the list of events to an associated component; and for each component that receives at least one associated event, requesting component related data for each associated event.

In yet another example, a server is disclosed that includes a processor; and a memory coupled with and readable by the processor and storing therein a set of instructions which, when executed by the processor, cause the processor to: store in a cache a list of events wherein the list of events comprises at least one event associated with at least one component running on a client; and in response to receiving a poll request from the client, transferring relevant events to the client.

Any of the above example aspects include wherein the list of events is stored in a Redis Cache on the server.

Any of the above example aspects include detecting an error saving an event to the list of events stored on the server; starting a timer; and in response to receiving a polling request while the timer is active, sending an error message.

Any of the above example aspects include in response to the timer being active, each component requests event data directly from the server.

Any of the above example aspects include wherein the error is associated with a project identifier and a tenant identifier, and wherein the error message is sent in response to poll requests with a project identifier and a tenant identifier matching the project identifier and tenant identifier associated with the error.

Any of the above example aspects include determining a sleep time for the client exceeds a retention time for the list of events stored on the server; and in response to the sleep time for the client exceeding the retention time for the list of events stored on the server, sending an error message.

Any of the above example aspects include wherein in response to the error message, each component requests event data directly from the server.

Any of the above example aspects include wherein the list of events comprises a JavaScript Object Notation (JSON) file.

Any of the above example aspects include wherein the list of events comprises a plurality of events associated with a plurality of components.

Any of the above example aspects include wherein each record in the list of events comprises an event name, a tenant identifier, a project identifier, and a timestamp.

Any of the above example aspects include wherein the client broadcasting each event in the list of events received to the associated component comprises determining based on timestamps which events in the list of events are new from a previous poll request, and broadcasting each new event in the list of events received to the associated component.

Any of the above example aspects include determining based on timestamps which events in the list of events are new from a previous poll request; and broadcasting each new event in the list of events received to the associated component.

Any of the above example aspects include in response to receiving a poll request with a project identifier and a tenant identifier that matches the project identifier and the tenant identifier associated with the error, while the timer is active, transfer an error message.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112 (f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
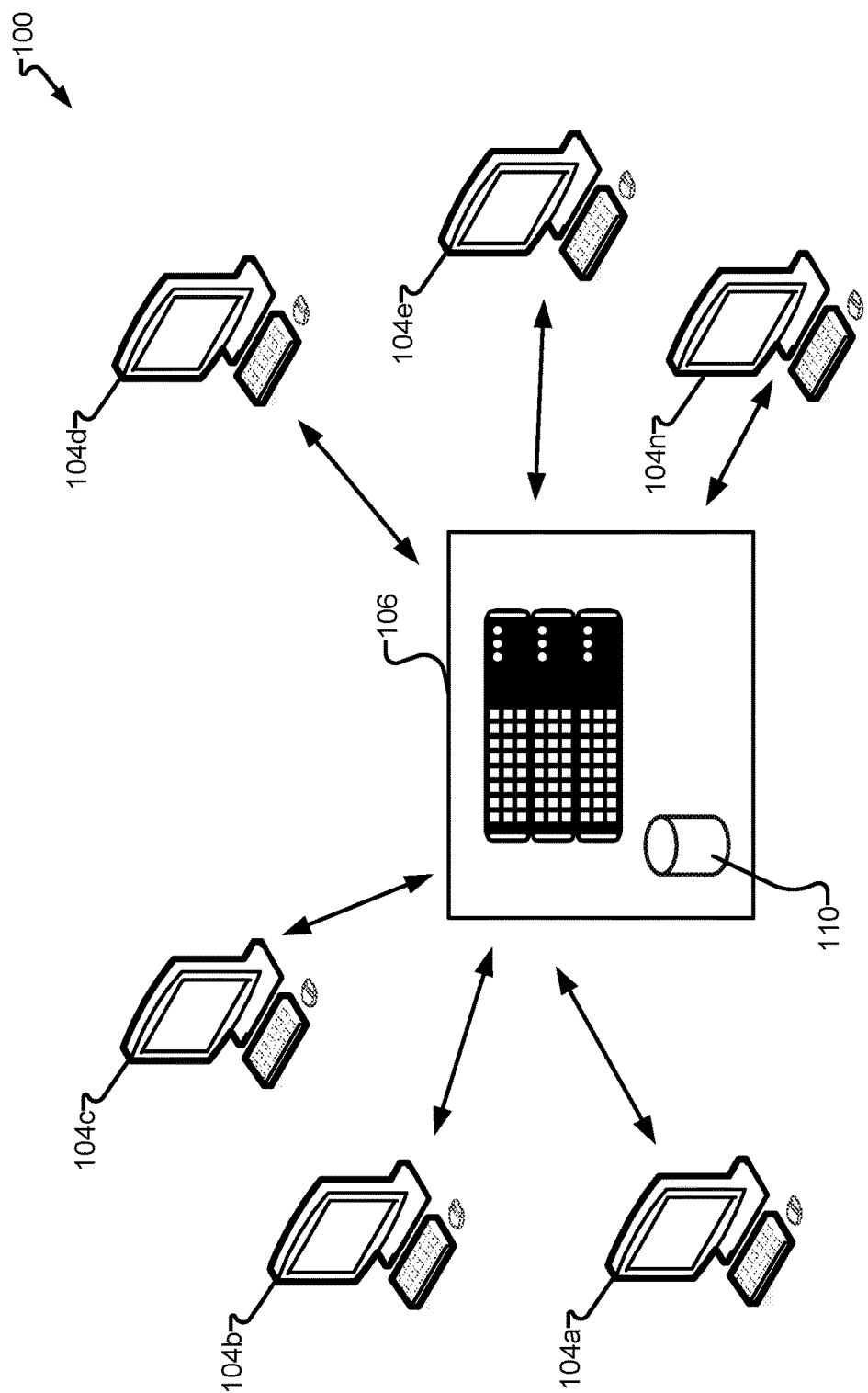
FIG. 1 is a block diagram of an illustrative system to use polling to simulate server events in accordance with the present disclosure.

FIG. 1 is a block diagram of a first illustrative system 100 to use polling to simulate server events. The illustrative system 100 comprises a server 106 and clients 104-$n$. The server 106 and the clients 104$a$-$n$ communicate over a network (not shown). The server includes storage (e.g., cache) 110.

The server 106 can be any known server, such as, an application server, a web server, a cloud service, a communications server, a security operations server, and/or the like.

The network can be, or may include any collection of communication equipment that can send and receive electronic communications, such as the Internet, a Wide Area Network (WAN), a Local Area Network (LAN), a Voice over IP Network (VOIP), the Public Switched Telephone Network (PSTN), a packet switched network, a circuit switched network, a cellular network, a combination of these, and the like. The network can use a variety of electronic protocols, such as Ethernet, Internet Protocol (IP), Hyper Text Markup Language (HTML), Representational State Transfer protocol (REST), and/or the like. Thus, the network is an electronic communication network configured to carry messages via packets and/or circuit switched communications.

The server 106 includes a storage/cache 110. The storage may comprise cache or another hardware or software component that stores data so that future requests for that data can be served faster. Cache hits served by reading data from the cache are faster than reading from a slower data store (e.g., a database call).

Figure 2:
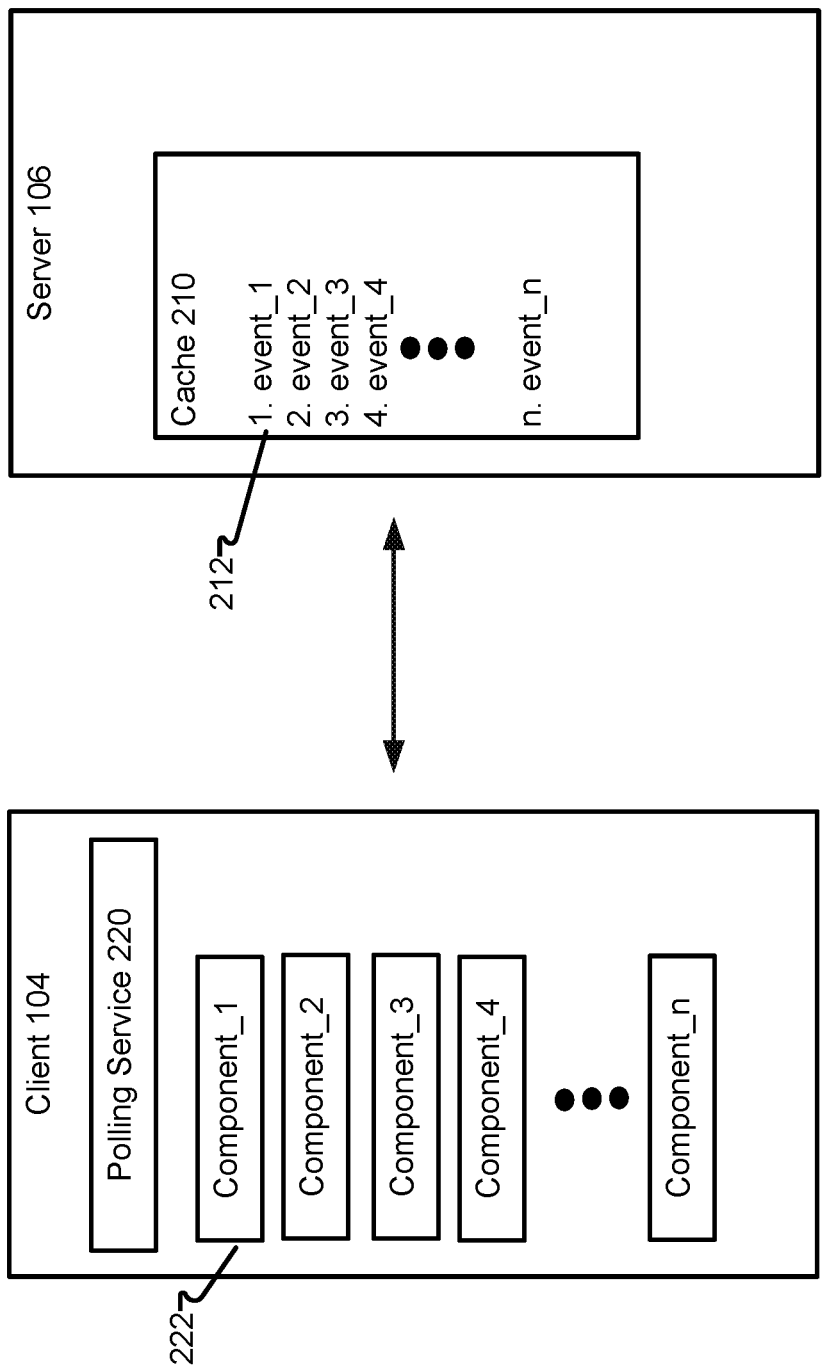
FIG. 2 is a block diagram illustrating additional detail of the illustrative system to use polling to simulate server events in accordance with the present disclosure.

FIG. 2 is a block diagram illustrating a more detailed view of the client 104 and the server 106 in the system 100 illustrated in FIG. 1. The client 104 includes a polling service 220 and components_1-$n$ 222. The polling service reduces the number of calls (e.g., polling) from the client 104 by replacing all existing (and future) polling with a single poll request for events in the server 106. In embodiments, the timing of poll requests from the polling service 220 may be specified or based on the shortest period in the various components_1-$n$ or otherwise configurable. Whenever an event in the server 106 happens, a record of the event is kept in the cache 210 in a list of events 212. When the client 104 polls for server events via the polling service 220, the list of events 212 is returned. The polling service 220 broadcasts server events to relevant components_1-$n$ 222. When a component_1-222 receives notification that a new event has occurred that is related to the respective component_1-$n$ 222, it will poll the server 106 for the relevant data. In embodiments, each record in the event list 212 consists of an event name and a time-stamp (e.g., 888:1:notifications: "time-stamp"). In other words, instead of each component_1-$n$ sending individual polls requests, the polling service 220 sends one request, and informs the relevant component_1-$n$ to request related event data, so any component_1-$n$ that does not have an associated event does not need to send a request.

Figure 3A:
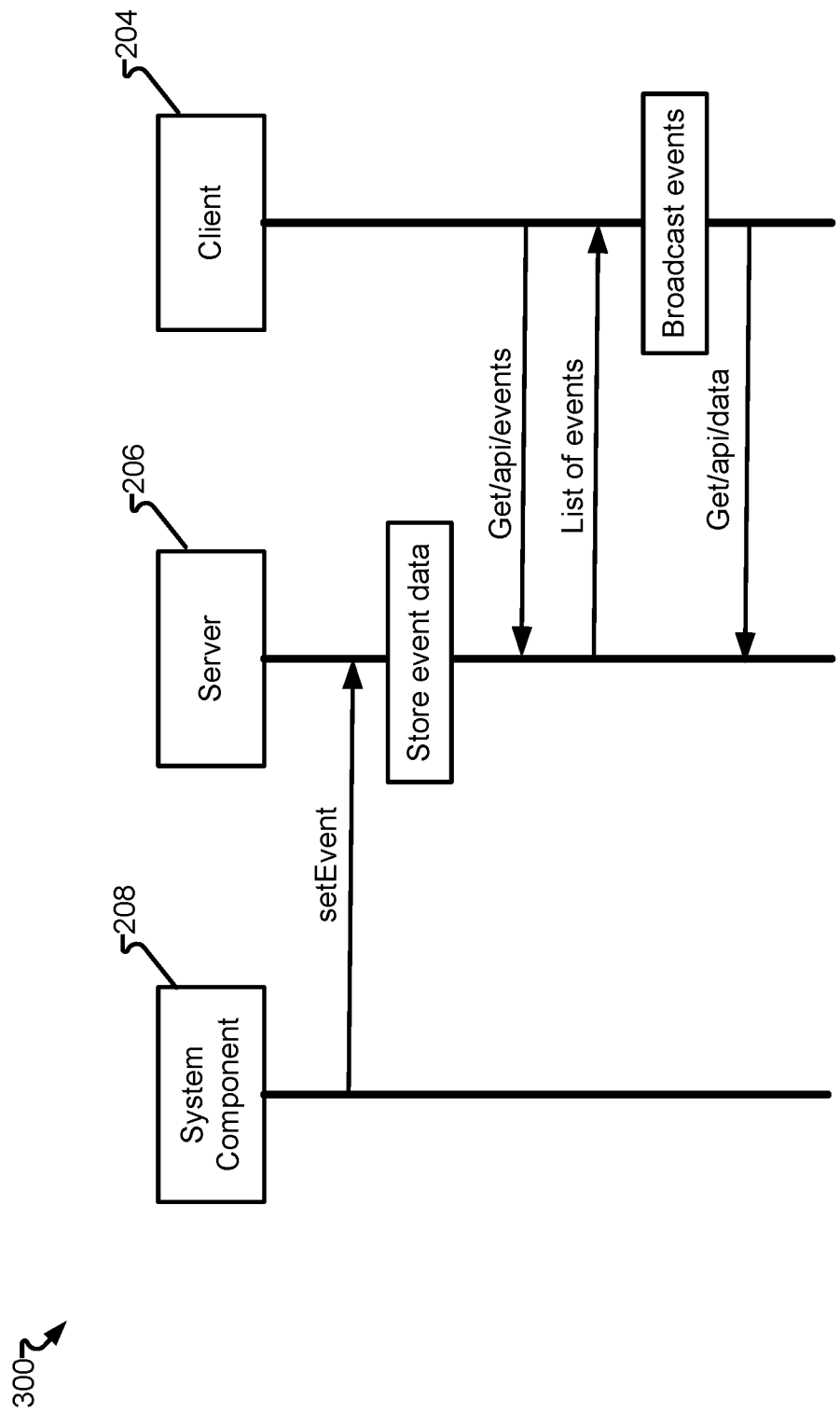
FIG. 3A is a flow diagram of a process to use polling to simulate server events in accordance with the present disclosure.

FIG. 3A is a flow diagram of a process 300 to use polling to simulate server events.

In one example, the system component 208 sends event data (e.g., setEvent (tenantId, projectId, event)) to the server 206. The system component 208 is one example of where event data may come from, however, one skilled in the art will recognize that event data may come from various different sources, including the server 206 itself. The server 206 stores the event data to the list of events 212 in the cache 210. The client 104 via the polling service 220, sends a poll request (e.g., Get/api/events). The server 206 sends the list of events 212 to the client 104 (e.g., getEvent (tenantId, projectId)). In embodiments, each event in the list of events 212 may remain on the list of events for a predetermined amount of time, and the event expires/is deleted at the end of the predetermined amount of time. Therefore, the list of events 212 may contain events that were previously sent to the client 104, the client 104 may use timestamps to determine which events in the list of events 212 is new since the last poll request. After determining which events in the list of events 212 is new since the previous poll request, the client 104 informs each component_1-n that has an associated event. Each component with a new event will request related event data from the server 206 (e.g., Get/api/data).

Figure 3B:
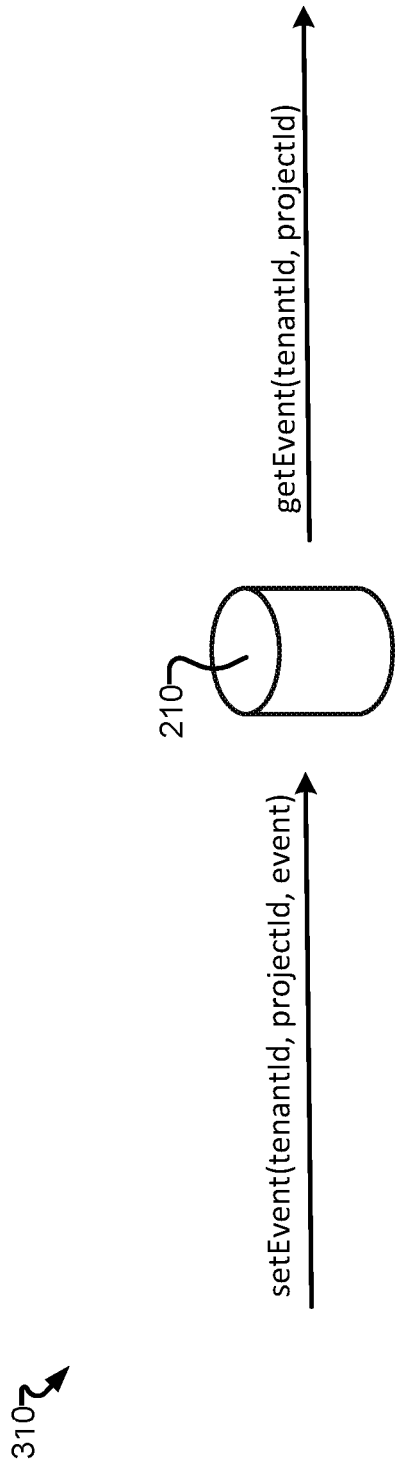
FIG. 3B illustrates an example server flow in accordance with the present disclosure.

FIG. 3B illustrates an example 310 of storing and retrieving events from an events list stored in cache 210. In embodiments, when an event is added to an event list stored in the cache 210 it includes information such as tenant identifier, project identifier, and event type (e.g., setEvent (tenant_id, project_id, event)). For example, setEvent (888, 1, 'notifications') has a tenant identifier of "888," a project identifier of "1," and the event type is "notifications," when the event is set, a timestamp is also added (e.g., "888:1:notifications:time=stamp"). In another example, setEvent (888, 1, 'notifications-oc') has a tenant identifier of "888," a project identifier of "1," and the event type is "notifications-oc," when the event is set, a timestamp is also added (e.g., "888:1:notifications-oc:time-stamp"). In response to a poll request from a client, the getEvent (tenant_id, project_id) returns the events.

Figure 4:
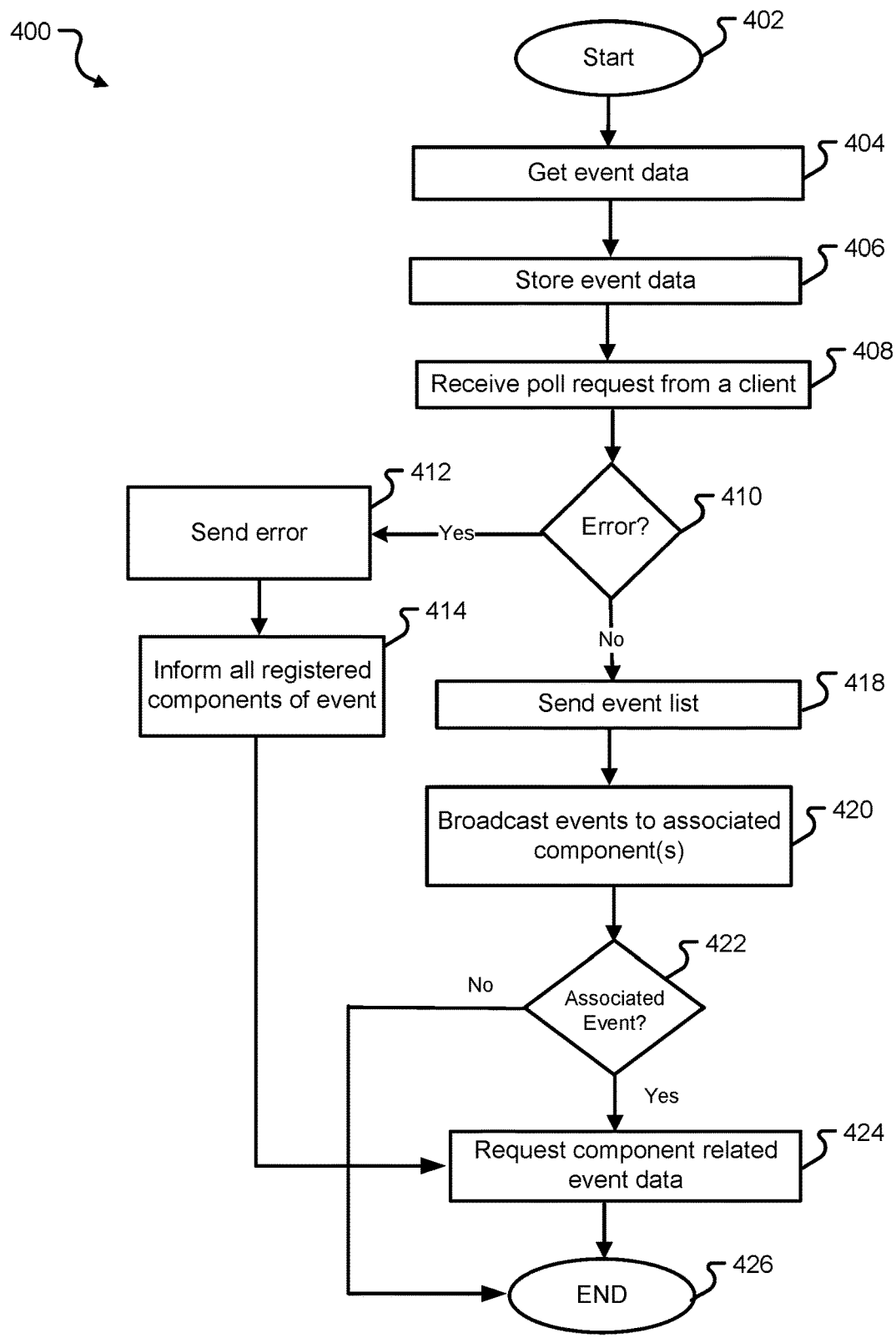
FIG. 4 is a flow diagram of a process to use polling to simulate server events in accordance with the present disclosure.

FIG. 4 is a flow diagram of a polling service process 400 to reduce poll requests associated with server events. In embodiments, at least a portion of the process 400 may be performed in a polling service 220.

The order of operations depicted in FIG. 4 should not be construed as limiting embodiments of the present disclosure. For instance, certain steps may be performed in a different order without departing from the scope of the present disclosure. Furthermore, some steps may be performed in parallel (e.g., simultaneously) with one another.

At step 402, the process 400 starts. In step 404, the server (e.g., the server 106/206) gets event data. In step 406, the server (e.g., the server 106/206) stores the event data (e.g., in the list of events 212). In step 408, a poll request from the client 104 is received.

In step 410 the service determines whether there is an error. One type of error that may occur is an error saving an event to the list of events 212 stored in the cache 110 on the server 106. The server 106 will return an error for each polling request for a certain amount of time (e.g., 1.5*polling-interval). Each instance of the error may reset a timer and the error message is returned if the timer is active. Another type of error may occur when a sleep duration of the client 104 exceeds the duration the list of events 212 is stored in the cache 110. While the client 104 is asleep, it stops polling, and so it might miss events. To detect this error, upon waking up, the client 104 sends the server 106 its sleep duration in an event-poll request. If the sleep duration exceeds the retention policy of the event records (e.g., the list of events 212) in the cache 110, the server 106 will send an error (step 412). Errors may be specific to a project identifier and/or tenant identifier. In either error case, in step 414, the polling service 220 will inform all registered components_1-n of a new event, so that each registered component_1-n will request component related event data in step 424 (e.g., regular polling).

In case of error (Yes), the polling service 220 send an error message (step 412) and notifies all registered components_1-n that an event relevant to them occurred (step 414). In other words, the polling service 220 does not know which registered components_1-n had a related event, so all registered components_1-n should poll for event data (step 424).

If there is no error, the server 106/206 will send the list of events 212 to the client 104 (step 418). The polling service 220 determines the relevant events(s) (e.g., new events since the last poll request) according to timestamps and broadcasts the events to the associated component(s) (step 420). In other words, the polling service 220 will only notify relevant component(s) (e.g., registered components_1-n) that has a new event (and not all components may have new event data). In step 422, each component_1-n that receives a notification of a new event (Yes), will request component related event data (step 424). For components_1-n that do not receive a notification of a new event (No), the process 400 ends (step 426). Advantageously, components_1-n that do not have new event data since the previous poll request, do not need to send request for event data, reducing the amount of traffic to the server.

If no error is detected in step 410, the list of events 212 is sent to the client 104. In step 420, the polling service broadcasts each event in the list of events 212 to the relevant component_1-n. For components_1-n that receive notification of an event in step 420 (Yes), each respective component requests related event data from the server 106. The process 400 ends in step 426.

Figure 5:
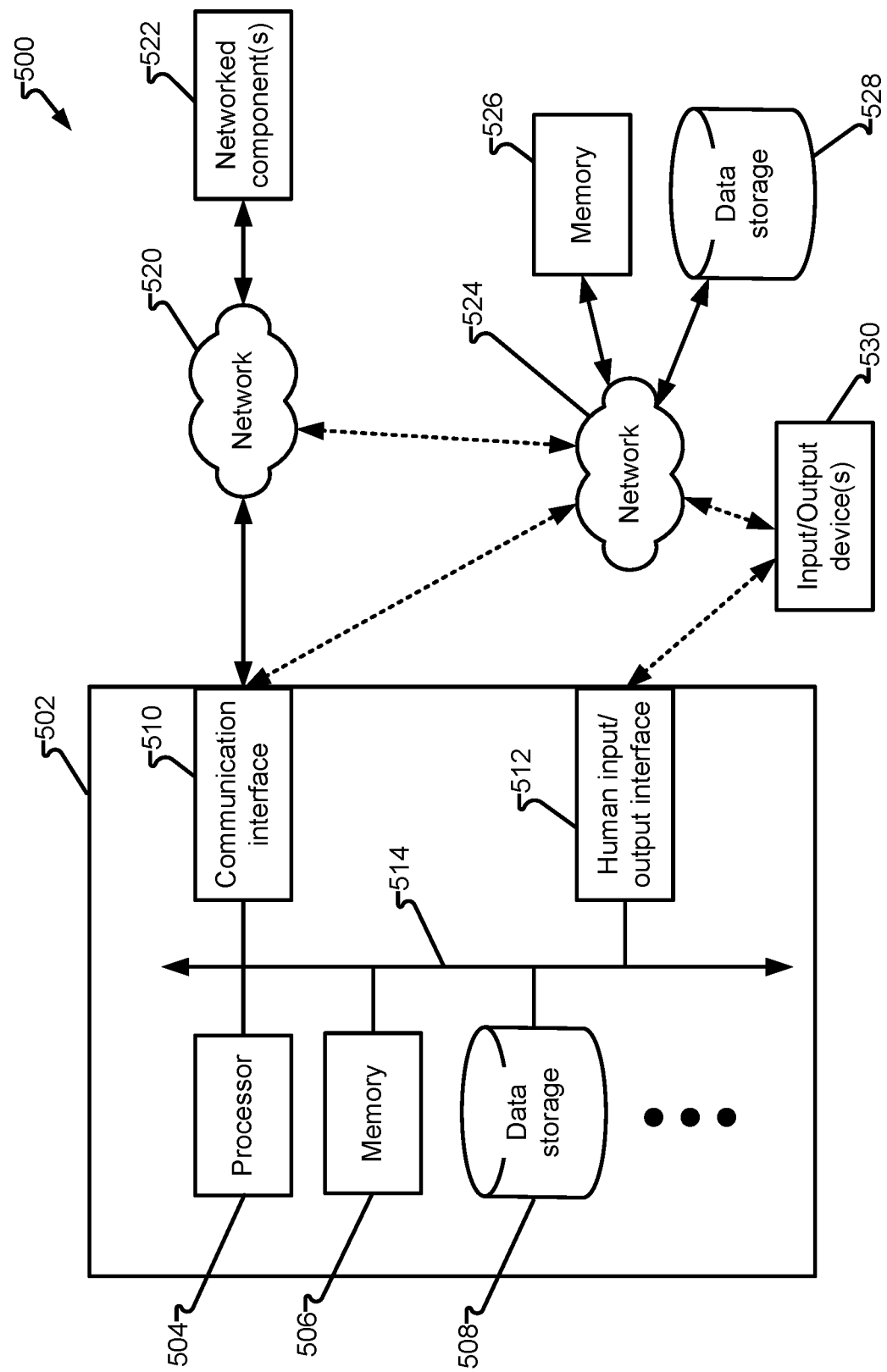
FIG. 5 is a block diagram of a user device in accordance with the present disclosure.

FIG. 5 depicts device 502 in system 500 in accordance with embodiments of the present disclosure. In one embodiment, one or more of client 104/204, server 106/206, or system component 208 may be embodied, in whole or in part, as device 502 comprising various components and connections to other components and/or systems. The components are variously embodied and may comprise processor 504. The term "processor," as used herein, refers exclusively to electronic hardware components comprising electrical circuitry with connections (e.g., pin-outs) to convey encoded electrical signals to and from the electrical circuitry. Processor 504 may comprise programmable logic functionality, such as determined, at least in part, from accessing machine-readable instructions maintained in a non-transitory data storage, which may be embodied as circuitry, on-chip read-only memory, computer memory 506, data storage 508, etc., that cause the processor 504 to perform the steps of the instructions.

Processor 504 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 504 is a non-transitory computing device (e.g., electronic machine comprising circuitry and connections to communicate with other components and devices).

Processor 504 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 504). Processor 504 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 504, device 502 may utilize computer memory 506 and/or data storage 508 for the storage of accessible data, such as instructions, values, etc. Communication interface 510 facilitates communication with components, such as processor 504 via bus 514 with components not accessible via bus 514. Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, speaker, microphone, still and/or video camera, etc. In another embodiment, communication interface 510 may comprise, or be comprised by, human input/output interface 512. Communication interface 510 may be configured to communicate directly with a networked component or configured to utilize one or more networks, such as network 520 and/or network 524.

Network 520 may be a wired network (e.g., Ethernet), wireless (e.g., WiFi, Bluetooth, cellular, etc.) network, or combination thereof and enable device 502 to communicate with networked component(s) 522. In other embodiments, network 520 may be embodied, in whole or in part, as a telephony network (e.g., public switched telephone network (PSTN), private branch exchange (PBX), cellular telephony network, etc.).

Additionally or alternatively, one or more other networks may be utilized. For example, network 524 may represent a second network, which may facilitate communication with components utilized by device 502. For example, network 524 may be an internal network to a business entity or other organization, whereby components are trusted (or at least more so) than networked components 522, which may be connected to network 520 comprising a public network (e.g., Internet) that may not be as trusted.

Components attached to network 524 may include computer memory 526, data storage 528, input/output device(s) 530, and/or other components that may be accessible to processor 504. For example, computer memory 526 and/or data storage 528 may supplement or supplant computer memory 506 and/or data storage 508 entirely or for a particular task or purpose. As another example, computer memory 526 and/or data storage 528 may be an external data repository (e.g., server farm, array, "cloud," etc.) and enable device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of computer memory 506, data storage 508, computer memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, a switch, a port, or other communication component such that a particular output of processor 504 enables (or disables) input/output device 530, which may be associated with network 520 and/or network 524, to allow (or disallow) communications between two or more nodes on network 520 and/or network 524. One of ordinary skill in the art will appreciate that other communication equipment may be utilized, in addition or as an alternative, to those described herein without departing from the scope of the embodiments.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of polling for server events, the method comprising:
   storing, on a server, a list of events;
   polling, by a client, the server for the list of events;
   receiving, at the client, the list of events stored on the server;
   broadcasting, by the client, each event in the list of events received to an associated component;
   requesting, by each component that receives at least one associated event, component related event data for each associated event;

detecting an error saving an event to the list of events stored on the server;

starting a timer; and in response to receiving a polling request while the timer is active, sending an error message.

2. The method of claim 1, wherein the list of events is stored in a Redis Cache on the server.

3. The method of claim 1, further comprising:

in response to the timer being active, each component requesting event data directly from the server.

4. The method of claim 1, wherein the error is associated with a project identifier and a tenant identifier, and wherein the error message is sent in response to poll requests with a project identifier and a tenant identifier matching the project identifier and tenant identifier associated with the error.

5. The method of claim 1, further comprising:

determining a sleep time for the client exceeds a retention time for the list of events stored on the server; and in response to the sleep time for the client exceeding the retention time for the list of events stored on the server, sending a second error message.

6. The method of claim 5, wherein in response to the second error message, each component requests event data directly from the server.

7. The method of claim 1, wherein the list of events comprises a JavaScript Object Notation (JSON) file.

8. The method of claim 1, wherein the list of events comprises a plurality of events associated with a plurality of components.

9. The method of claim 1, wherein each record in the list of events comprises an event name, a tenant identifier, a project identifier, and a timestamp.

10. The method of claim 1, wherein the client broadcasting each event in the list of events received to the associated component comprises determining based on timestamps which events in the list of events are new from a previous poll request, and broadcasting each new event in the list of events received to the associated component.

11. The method of claim 1, wherein each event in the list of events is deleted after a predetermined amount of time from when each event was added to the list of events.

12. The method of claim 1, wherein a timing of polling the server is based on a shortest polling time of all polling times for components on the client.

13. A system, comprising:

a processor; and a memory coupled with and readable by the processor and storing therein a set of instructions which, when executed by the processor, cause the processor to poll for server events by:

transferring a poll request for a list of events associated with a project identifier and a tenant identifier, wherein the list of events is stored on a server;

in response to receiving the list of events from the server, broadcasting each event in the list of events to an associated component, and for each component that receives at least one associated event, requesting component related data for each associated event; and in response to receiving an error message in response to the poll request, each component sending a respective request for event data, wherein the error message is sent in response to the poll request being within a predetermined amount of time of an error saving an event to the list of events stored on the server.

14. The system of claim 13, wherein the set of instructions further cause the processor to:

determine based on timestamps which events in the list of events are new from a previous poll request; and broadcast each new event in the list of events received to the associated component.

15. The system of claim 13, wherein each event in the list of events is deleted after a predetermined amount of time from when each event was added to the list of events.

16. The system of claim 13, wherein a timing of polling the server is based on a shortest polling time of all polling times for components on the system.

17. A server, comprising:

a processor; and a memory coupled with and readable by the processor and storing therein a set of instructions which, when executed by the processor, cause the processor to:

store in a cache a list of events wherein the list of events comprises at least one event associated with at least one component running on a client;

in response to receiving a poll request from the client, transfer relevant events to the client;

detect an error storing one or more events to the list of events stored in the cache, wherein the error is associated with a project identifier and a tenant identifier;

start a timer; and in response to receiving the poll request with the project identifier and the tenant identifier that matches the project identifier and the tenant identifier associated with the error, while the timer is active, transfer an error message.

18. The server of claim 17, wherein the poll request from the client indicates a sleep time for the client, and in response to the sleep time for the client exceeding a retention time for the list of events stored on the server, the set of instructions cause the processor to:

transfer a second error message to the client.

19. The server of claim 17, wherein the set of instructions further cause the processor to:

determine based on timestamps which events in the list of events are new from a previous poll request; and broadcast each new event in the list of events received to an associated component.

20. The server of claim 17, wherein a timing of polling the server is based on a shortest polling time of all polling times for components on the client.

* * * * *